United States Patent Office 3,216,300
Patented Nov. 9, 1965

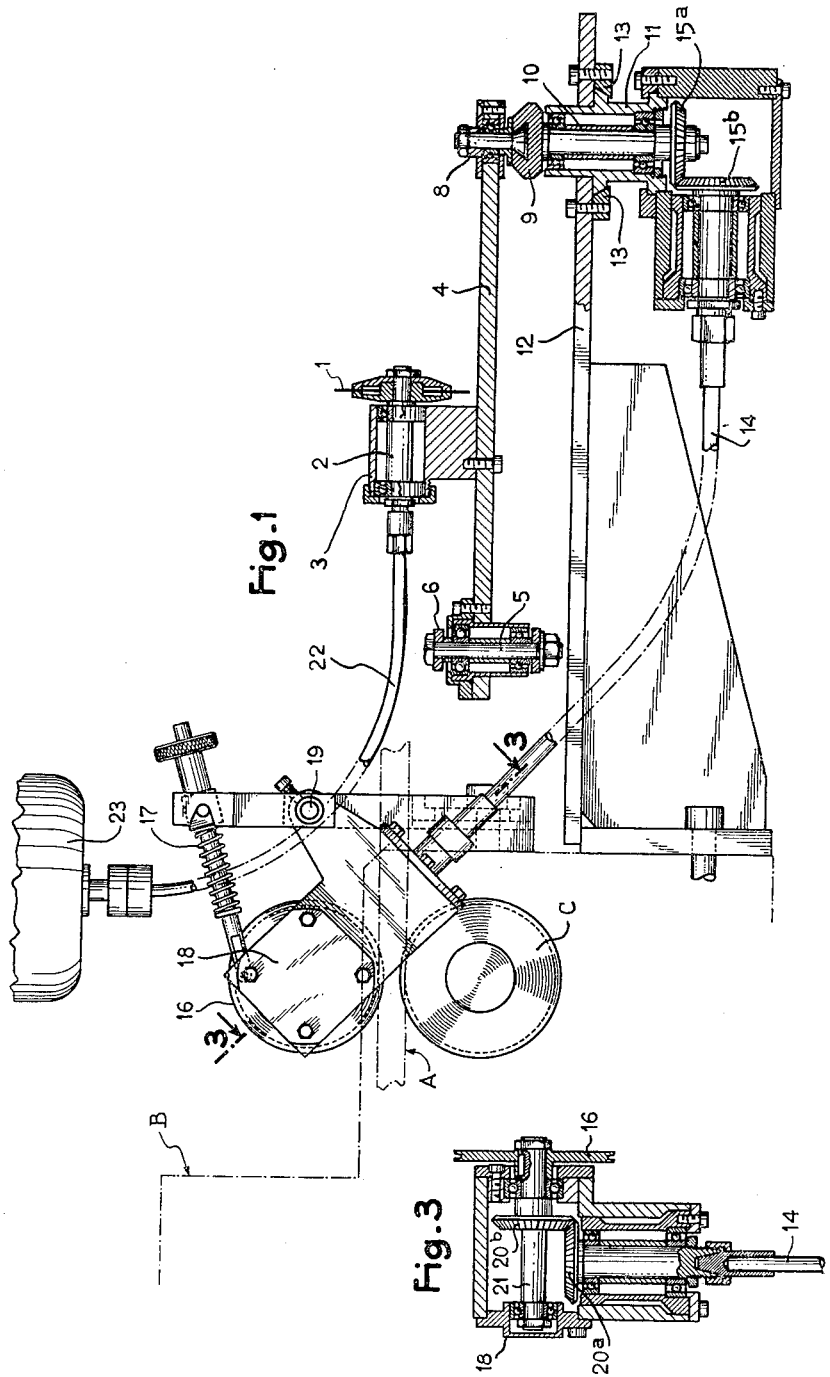

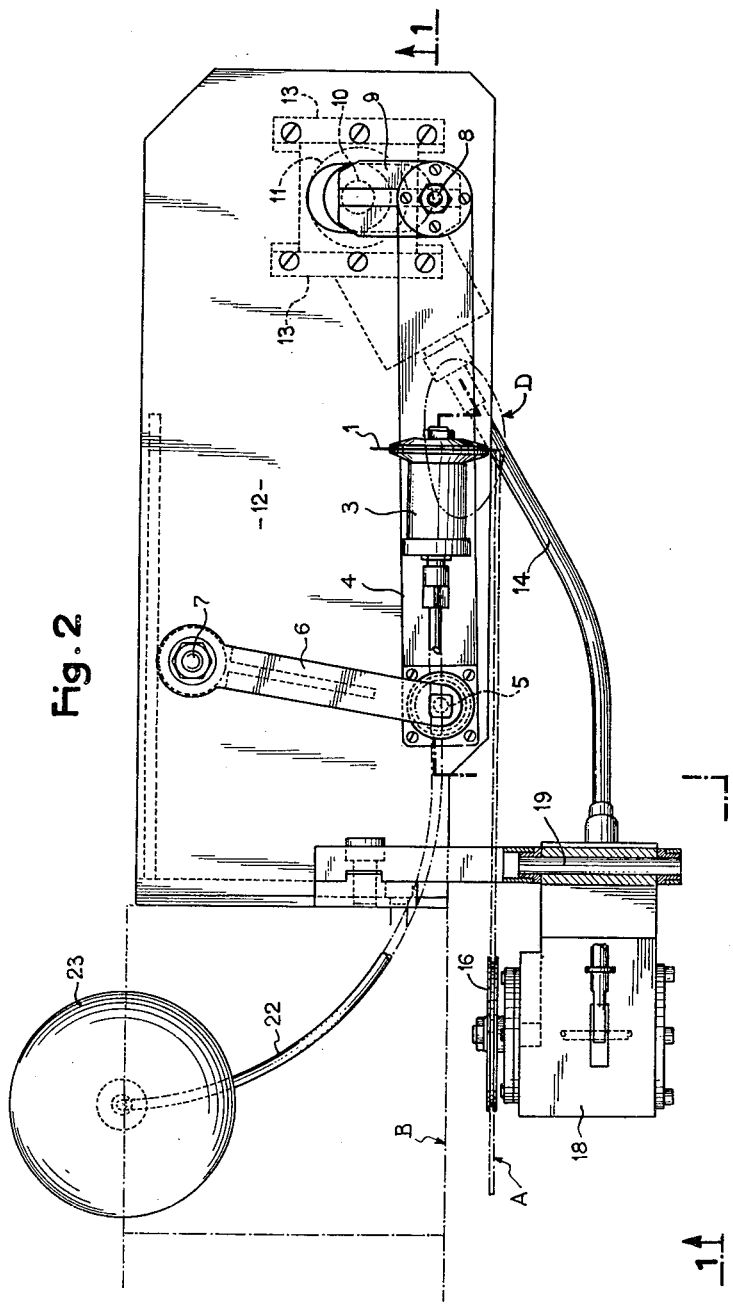

3,216,300
WORK DRIVEN FLYING CUT-OFF MACHINE
Achille François Epiphane Edmon, Satrouville, France, assignor to Societe de Constructions Mecaniques et Aeronautiques de la Mayenne, Paris (Seine), France
Filed June 27, 1963, Ser. No. 291,052
Claims priority, application France, July 24, 1962, 904,880, Patent 1,375,686
12 Claims. (Cl. 83—295)

The invention relates to a flying cutting-off machine for tubes, bars or other workpieces, and more particularly to a cutting-off machine whose kinematics are such that the cutting-off operation occurs "in flight" during the displacement of the tube or the like to be cut up. For the sake of simplicity, reference will be made below to the particular case of cutting up a tube.

With most flying cuttting-off machines the cutting operation is effected by means of a rotary tool, such as a saw, carried by a reciprocatory carriage or by a pendular arm, the reciprocatory or pendular movement being controlled by a measuring mechanism which is actuated by the tube or its driving device, sometimes by means of an additional driving force controlled by the measuring mechanism. In these known cutting-off machines it is necessary to impart a movement to the saw relatively to the tube in a direction perpendicular to the direction of advance of the tube so that the saw may not come into untimely contact with the tube during the return movement of the carriage or the pendular arm.

This relative movement is achieved either by the flexion of the tube towards the saw at the moment at which the cut is effected or by a supplementary movement of the pivot of the pendular arm or of the carriage assembly perpendicularly to the tube axis. This movement, which is difficult to achieve, is always rough and accompanied by vibration and substantial mechanical effort so that the speed of action and the capacity of the cutting-off machine are restricted. Moreover, the force which is required to overcome the mechanical effort makes it often necessary to apply additional power.

An object of the invention is to obviate these disadvantages and to provide a flying cutting-off machine of light and simple construction and whose manner of movement requires only very weak forces and consequently allows for very high-speed operation of the machine, which machine requires minimal maintenance but ensures that equal lengths of the workpiece are cut off with great precision.

The cutting-off machine of the invention is characterized in that the saw is carried by an arm having one end connected to the pin of an adjustable crank and the other end guided to describe either a straight line or an arc of a circle of relatively large radius so that the cutting edge of the saw, located between the ends of the arm, describes a closed curve approximating an ellipse or oval, of which one arc intersects the path of the workpiece to be cut up, for the cutting phase, while another arc is remote therefrom, for the return phase of the saw.

Further features of the invention are described below with reference to the accompanying drawings, in which:

FIGURE 1 is a vertical section taken on the line 1—1 of FIGURE 2;

FIGURE 2 is a plan view of the machine shown in FIGURE 1; and

FIGURE 3 is a partial section taken on the line 2—2 of FIGURE 1.

Referring to the drawings, A designates the workpiece to be cut up, for example a flat tube which is caused to move continuously from the outlet of a profiling machine B situated to the left of the cutting-off machine as represented in FIGURES 1 and 2.

The cutting tool is a circular saw 1 whose arbor 2 is mounted in a bearing 3 carried by an arm 4. The arm is connected at one end by a joint 5 to a lever 6 which oscillates about a fixed pivot 7 so as to describe an arc of a circle of relatively large radius.

The other end of the arm 4 is fixed to a pin 8 of a crank 9 of adjustable radius. The crank 9 has a shaft 10 which turns in a vertical bearing 11 mounted on the frame 12 of the cutting-off machine for displacement along a slide 13 in a direction perpendicular to the axis of the workpiece.

The shaft 10 of the crank 9 is caused to rotate by a flexible shaft 14 and, if necessary, a pair of bevelled gears 15a and 15b, the flexible shaft being connected at its other end to a measuring element 16, for example a grooved wheel which is caused to rotate by the workpiece A against which it is pressed by the force of a spring 17 co-operating with a tumbler 18 which carries the bearing for the measuring wheel 16 and is pivoted about a pin 19. A grooved wheel or pulley C supports the tube opposite the wheel 16. This pulley may, more particularly, be the last element of the machine for forming the tube.

Just as the bevelled gears 15a and 15b may be inserted between the flexible shaft 14 and the crankshaft 10 so as to reduce the strain on the shaft 10, so may bevelled gears 20a and 20b (FIGURE 3) be inserted between the flexible shaft and the axle 21 of the measuring wheel 16.

The saw 1 may be caused to rotate by a flexible shaft 22 which is driven by a motor 23.

The lever 6 may be replaced by a straight or curved slide serving to guide the joint 5.

The machine operates as follows. A measuring wheel 16 is fitted whose circumference is equal to the length of the pieces to be cut off from the workpiece, the eccentricity of the crank 9 is adjusted to a radius substantially equal to the radius of the wheel 16 and the position of the bearing 11 is adjusted so that the path of the cutting edge of the saw intersects the path of the workpiece. The machine for forming the tube is then started. The tube leaves such machine in a continuous length and the friction between the tube and the wheel 16 causes the latter to rotate. The rotation of the wheel 16 is then transmitted by the flexible shaft 14 to the crank 9. Circular motion is thus imparted to the joint 8 between the arm 4 and the crank 9, whereas the joint 5 is caused to execute a pendular or reciprocatory motion. The saw is then disposed in a position between the joints 5 and 8 and its cutting edge describes a path which more or less approximates an ellipse or oval, as indicated by the dot-dash line D in FIGURE 2. In the zone where the cutting edge of the saw intersects the workpiece A, its displacement is in the same direction as that of the workpiece and its speed of displacement is substantially equal to that of the workpiece. Thus, the tube is cut without being deformed. On continuing its movement the cutting edge of the saw executes a retreating movement while accompanying the workpiece at a speed which is slightly greater than that of the workpiece. This acceleration is determined by the mid-position of the lever 6, which position can be moved to the left with reference to the perpendicular to the passing tube by the pivot 7 or by the inclination of the slide which might replace the lever 6.

On continuing its rotation the crank returns the assembly to the commencing position of the cycle and, owing to the shape of the curve D, this takes place without the saw being able to touch the tube.

For reasons of mechanical convenience, it may be desirable to give the wheel 16 a circumference which is greater or smaller than the length of the cut-off portions of tube. This may be readily achieved by suitably selecting the gear ratio of the pairs of gears 15a, 15b and 20a, 20b. The adjustable radius of the crank must always be equal to half the length of the cut-off portions of tube.

Naturally, the invention is not restricted to the embodiment described and illustrated, which was selected only by way of example.

What is claimed is:

1. A flying cutting-off machine comprising a circular saw, an arm carrying said saw extending transversely therewith, a driving rotatable crank pivotally connected to one end of said arm to carry and move said end along a circular path, a guide carrying said arm at the second end thereof and provided to guide said second end along a path comprised between an arc of circle greater than the arc of circle followed by said rotatable crank and a rectilinear line whereby said saw is driven along a closed and flattened curve, and means to synchronize the speed of said rotable crank and of a workpiece to be cut such that the workpiece is moved continuously and guided to intercept said flattened curve followed by said saw.

2. A flying cutting-off machine as claimed in claim 1 in which said guide carrying the second end of said arm comprises an oscillatory lever and a pivot to which said arm is pivotally connected, said oscillatory lever being positioned so that in mid-position thereof, which is determined relatively to the perpendicular to the direction of movement of the workpiece by the position of the pivot of said lever, the said oscillatory lever is inclined in a direction which is opposite to that of said movement, so that the cutting edge of the saw has, after cutting the workpiece, a speed of displacement which is greater than that of the workpiece and travels in the same general direction as the workpiece.

3. A flying cutting-off machine as claimed in claim 1, in which said driving rotatable crank includes an adjustable protruding pin on which said arm is pivotally mounted, whereby the circular path of said crank is adjustable, thus enabling adjustment of said closed curve followed by the saw.

4. A flying cutting-off machine as claimed in claim 1, comprising a shaft, an axially adjustable carriage, a flexible shaft, a measuring member for engaging said workpiece; and in which said rotatable crank is driven by the first said shaft which is rotatably mounted in said axially adjustable carriage and in which said flexible shaft connects the first said shaft with said measuring member whereby movement of said crank is synchronized with the movement of said workpiece independently of the position of said carriage.

5. Apparatus for cutting an elongated workpiece moving in a determinable direction along a determinable path, said apparatus comprising saw means including a cutting edge aligned transversely of said path, support means supporting the saw means and including end portions extending on opposite sides of said cutting edge to spaced positions adjacent said path, drive means pivotally engaging the end portion at one of said positions and imparting a circular drive thereto, and guide means pivotally engaging the end portion at the other of said positions and guiding the same reciprocally along a shallow arcuate path substantially parallel to the path of the workpiece, whereby said cutting edge is driven along an elliptical path, said saw means being positioned such that said cutting edge in following the elliptical path intersects the path of the workpiece only on one side of the major axis of the elliptical path.

6. Apparatus as claimed in claim 5, wherein the drive means includes means which imparts to the related end portion a driving motion along a circle of determinable radius and the guide means includes means which guides the related end portion along an arcuate path of greater radius.

7. Apparatus as claimed in claim 6, including synchronizing means coupled to said drive means and engaging the workpiece, said synchronizing means driving the drive means according to the speed of said workpiece.

8. Apparatus as claimed in claim 7, wherein the synchronizing means includes a flexible cable and gear means interposed between the cable and workpiece and between the cable and drive means.

9. Apparatus as claimed in claim 7, wherein the drive means includes a crank coupled to the related end portion, and means to adjust the effective radius of said crank.

10. Apparatus as claimed in claim 7 comprising a power source and flexible means coupling said source to said saw means.

11. Apparatus as claimed in claim 7, wherein the guide means comprises a pivotable lever coupled to said support means.

12. Apparatus as claimed in claim 7, wherein the guide means and drive means have parallel pivotal axes.

References Cited by the Examiner

UNITED STATES PATENTS

| 1,066,012 | 7/13 | Hemming. | |
| 1,619,975 | 3/27 | Hawkins | 83—329 X |
| 1,944,718 | 1/34 | Rafter. | |
| 2,645,001 | 7/53 | Rodder | 83—327 X |
| 2,796,125 | 6/57 | Munchbach | 83—327 |
| 2,947,184 | 8/60 | Olson | 83—324 |
| 3,143,021 | 8/64 | Vom Dorp | 83—329 |

WILLIAM W. DYER, JR., *Primary Examiner.*

ANDREW R. JUHASZ, *Examiner.*